Patented Apr. 5, 1927.

1,623,516

UNITED STATES PATENT OFFICE.

HEINRICH ZOELLY, OF ZURICH, SWITZERLAND.

RAILWAY VEHICLE.

Application filed June 8, 1926, Serial No. 114,465, and in Switzerland June 17, 1925.

The invention relates to a railway vehicle with at least two bogies and it has for its object to provide a vehicle of this kind which will travel smoothly and without shocks. For the attainment of this object, according to the invention, the frame carrying the vehicle body is sprung relatively to the bogies and each bogie is furnished with not less than three axles. These axles are so journaled in the bogie that, so far as depressions in the permanent way are concerned they behave like rigidly journaled axles, while, in travelling over bumps on the track they are adapted to yield resiliently in an upward direction.

The accompanying drawing illustrates, by way of example, embodiments of the invention.

Figure 1:
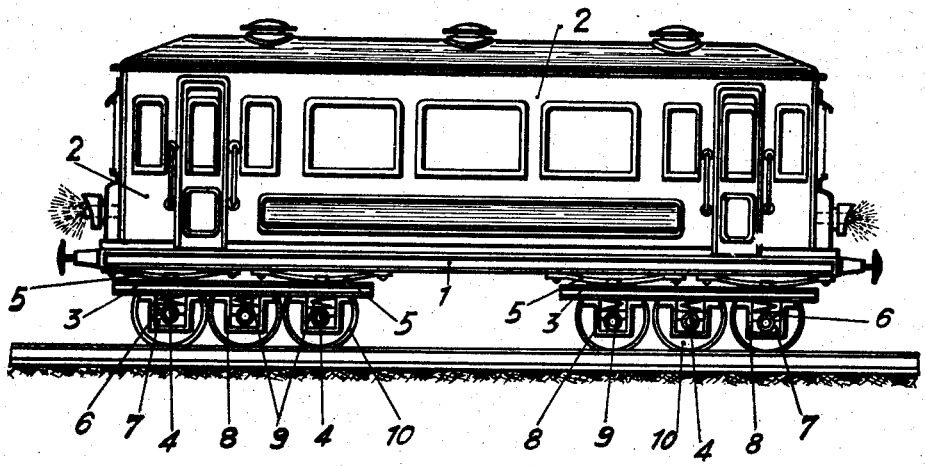
Fig. 1 shows a passenger coach with two bogies, each bogie having three axles.

Numeral 1 designates a frame serving to carry the coach body 2. The frame 1 rests on two bogies 3, each having three axles 4. The upper frame 1 is sprung relatively to the bogies 3, by means of springs 5. The wheel axles 4 are journaled in bearings each consisting of two parts 6, 7. The lower members 7 of these bearings are carried in bearer brackets 8, rigidly fixed to the bogie frames 3. Upon the member 6 of each bearing there acts a spring 9 the upper end of which bears against the bogie frame 3. In comparison with the coach body and its frame 1, the bogies 3 are relatively light.

In travelling over a depression in the track the particular wheel 10 which happens to be over such depression cannot fall into it, since the bogie concerned is still supported at five points and because, moreover, the bearer 8, which is rigidly fixed to the bogie frame 3, functions, together with the lower journal bearing member 7 as a fixed stop for the axle 4 in question. The other eleven wheels 10 are all subjected to an increased load amounting to one-twelfth of the normal which is substantially taken up by the springs 9, so that the springs 5 are subjected to practically no change of load. Thus the effect of depressions in the track is only to increase slightly the loading of certain of the springs 9 without substantially affecting the springs 5; thus when travelling over such depressions the upper frame 1 remains at rest relatively to the bogies 3. Thus are avoided the shocks which would inevitably arise when a wheel 10, having dropped into a depression rebounded from the ascending surface of the latter.

In travelling over a bump the wheel 10, meeting the same—or, rather, the axle 4 of said wheel—is lifted somewhat. In this case, first and foremost the springs 9 of the axle bearing concerned are compressed to a certain extent, the said axle being thus permitted to yield resiliently in an upward direction. The remaining springs 9 of the bogie under consideration are somewhat compressed in a downward direction from above, so that the sprung frame of the bogie takes up a slightly oblique position. The upper frame 1 will, however, not simply assume a position parallel to the bogie in question but will tend, as far as possible to maintain its original horizontal position, since, in view of the heavier masses involved, it has more inertia to overcome. Thus the above mentioned widely differing apportionment of masses as between the frame 1 and the bogies 3 operates favourably in maintaining a steady position for the frame 1. Only when the reaction on the springs 9 is a very powerful one will a part of this reaction have to be absorbed by the springs 5. A vehicle of the type described will therefore travel much more smoothly and with less shocks than those vehicles known hitherto.

Figure 2:
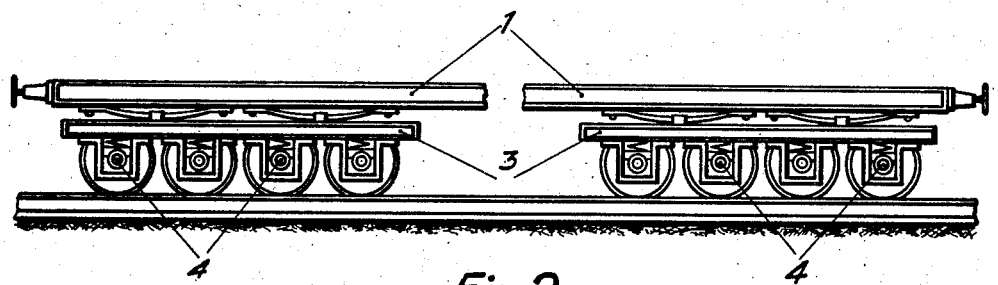
Fig. 2 shows parts of a vehicle with two bogies, each bogie having four axles.
Figure 3:
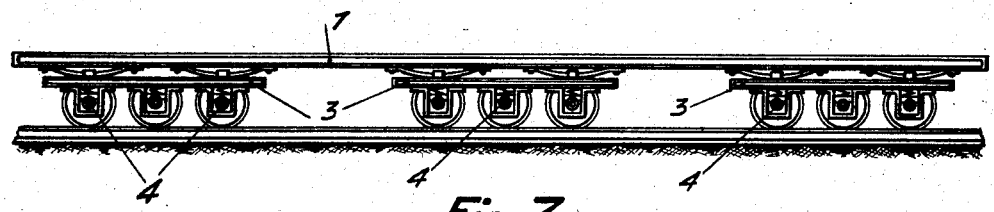
Fig. 3 shows the lower part of a vehicle with three bogies each of which has three axles.

The invention may also be applied to vehicles having more than three axles to each bogie, as shown in Fig. 2 where each bogie 3 has four axles 4, or also to vehicles having more than two bogies, as shown in Fig. 3, where the vehicle has three bogies 3 each of which has three axles 4. Moreover the particular construction of the axle bearings 6, 7 and their bearers 8, acting as a stop, forms no essential part of the invention; the only essential being that these members should be so constructed that the axles 4 may, with respect to depressions in the track behave like rigidly journaled axles, whilst in traveling over bumps they may yield resiliently in an upward direction.

I claim:

1. A railway vehicle, comprising in combination, a frame carrying the vehicle body, at least two bogies, springs between the bogies and said frame, at least three wheel axles for each bogie and means to permit the axles so far as depressions in the permanent way are concerned, to behave like rigidly journaled axles, while, in travelling over bumps on the permanent way they are adapted to yield resiliently in an upward direction.

2. A railway vehicle, comprising in combination, a frame carrying the vehicle body, at least two bogies, springs between the bogies and said frame, at least three wheel axles for each bogie, and means to journal said wheel axles in said bogies which means include resilient means adapted to yield in the upward direction when the vehicle travels over bumps in the permanent way, and stop means for preventing a downward movement of the wheel axles when the vehicle travels over depressions in the permanent way.

3. A railway vehicle, comprising in combination, a frame carrying the vehicle body, at least two bogies, springs between the bogies and said frame, at least three wheel axles for each bogie, and means to journal said wheel axles in said bogies which means include axle boxes mounted in pedestals fixed to the bogies and springs interposed between the axle boxes and the bogies and adapted to yield in the upward direction when the vehicle travels over bumps in the permanent way and stop means provided on the pedestals for preventing a downward movement of the wheel axles when the vehicle travels over depressions in the permanent way.

In testimony whereof, I have signed my name to this specification.

HEINRICH ZOELLY.